United States Patent
King (10) Patent No.: US 9,736,630 B2
(45) Date of Patent: Aug. 15, 2017

(54) SYSTEM AND METHOD TO FACILITATE ASSISTANCE IN DISTRESS SITUATIONS

(71) Applicant: Rudolf C. King, Altenstadt (DE)

(72) Inventor: Rudolf C. King, Altenstadt (DE)

( * ) Notice: Subject to any disclaimer, the term of this patent is extended or adjusted under 35 U.S.C. 154(b) by 53 days.

(21) Appl. No.: 14/784,213

(22) PCT Filed: Mar. 19, 2014

(86) PCT No.: PCT/EP2014/055495
§ 371 (c)(1),
(2) Date: Oct. 13, 2015

(87) PCT Pub. No.: WO2014/170081
PCT Pub. Date: Oct. 23, 2014

(65) Prior Publication Data
US 2016/0037292 A1    Feb. 4, 2016

(30) Foreign Application Priority Data

Apr. 17, 2013 (EP) .................... 13164096

(51) Int. Cl.
*H04M 11/04* (2006.01)
*H04W 4/02* (2009.01)
(Continued)

(52) U.S. Cl.
CPC .......... *H04W 4/02* (2013.01); *G08B 21/0415* (2013.01); *G08B 21/0423* (2013.01);
(Continued)

(58) Field of Classification Search
CPC ...... H04W 4/02; H04W 4/22; G08B 21/0415; G08B 21/0423; G08B 25/10; G08B 25/016
(Continued)

(56) References Cited

U.S. PATENT DOCUMENTS

| 6,054,928 A | 4/2000 | Lemelson et al. |
| 2008/0001735 A1* | 1/2008 | Tran .................... G06F 19/3418 340/539.22 |

(Continued)

FOREIGN PATENT DOCUMENTS

| EP | 1679672 A1 | 7/2006 |
| WO | 2004084720 A2 | 10/2004 |
| WO | 2004084721 A1 | 10/2004 |

OTHER PUBLICATIONS

International Search Report issued Jul. 2, 2014 in International Application No. PCT/EP2014/055495.

*Primary Examiner* — Marcos Batista (74) *Attorney, Agent, or Firm* — Panitch Schwarze Belisario & Nadel LLP (57) ABSTRACT

A system may comprise a processor-based portable device having a communication unit and a position determining unit and a life circle database. One or more life circle records are defined in the life circle database. Each life circle record is associated with a position/location and comprises contact information and/or instructions to be applied for contacting at least one responder and/or for performing one or more predefined operations in case of a distress situation of a bearer of the processor-based portable device. A life circle record to be used at a distress situation is selected on the basis of a current position of the processor-based portable device.

21 Claims, 4 Drawing Sheets

(51) Int. Cl.
*G08B 21/04* (2006.01)
*G08B 25/01* (2006.01)
*G08B 25/10* (2006.01)
*H04W 4/22* (2009.01)

(52) U.S. Cl.
CPC .......... *G08B 25/016* (2013.01); *G08B 25/10* (2013.01); *H04W 4/22* (2013.01)

(58) Field of Classification Search
USPC ....................................... 455/404.2; 370/338
See application file for complete search history.

(56) References Cited

U.S. PATENT DOCUMENTS

2009/0284348 A1* 11/2009 Pfeffer ................ G08B 25/006
340/7.3
2011/0090085 A1 4/2011 Belz et al.

* cited by examiner

SYSTEM AND METHOD TO FACILITATE ASSISTANCE IN DISTRESS SITUATIONS

CROSS REFERENCE TO RELATED APPLICATIONS

This application is a Section 371 U.S. National Stage Filing of International Application No. PCT/EP2014/055495, filed Mar. 19, 2014, which was published in the English language on Oct. 23, 2014, under International Publication No. WO 2014/170081 A1, which claims priority to European Patent Application No. 13164096.3, filed on Apr. 17, 2013, the disclosures of which are incorporated herein by reference.

It can be difficult for a victim of an accident or a sudden illness or a violent crime to alert general emergency services, the police or a third person, in particular if and as long as he or she is not capable to verbally communicate.

For general emergency services it can be difficult or outright impossible to gain entry to an area if the injured and/or otherwise handicapped victim to be rescued is located, or perceived to be located behind closed doors, in particular if the entry and security system has been designed with a main purpose of burglary prevention. Rescue attempts may also be quickly abandoned if there is certainty neither if the victim is in the enclosed area nor of permission to force entry into the enclosed area, for a breach or error may—depending on the laws of the country or state or constituency—constitute a crime or offence of illegal trespassing and/or damage to property.

While in most of the places a person frequents daily there will be a plethora of other persons who can help immediately, a system is still necessary and useful, if for example an office employee is alone in an office because his or her colleague(s) sharing one office left for lunch, vacation, a meeting or to smoke outdoors, or the person works alone at night; if the insufficiency happens while the person is using a toilet or is alone at even a large office space usually used by a great number of employees to work at night or is in the office space at the same time, his insufficiency might go undetected for minutes up to several hours. A married person might be alone in his or her house because he or she has retired while the partner is still working; a retired couple might spend hours apart every day while one partner goes shopping for groceries, is with the doctor or out to meet friends; in all these and other cases the bearer needs to be considered "helpless", for no other person will immediately be aware of an emergency situation.

Lowering the time for the emergency services to start first aid in particular in the case of a heart attack is crucial; 9 minutes after the attack heart tissue is usually destroyed without possibility of full recovery; after 13 minutes death is usually imminent; reducing the time to 5 minutes leaves a much greater chance of survival, reducing it to 3 minutes until basic first aid is administered can dramatically increase the likelihood for the bearer to leave the hospital after one or two nights of supervision rather than weeks, months or years of recovery. Similar times are true for strokes and aneurysms.

Several attempts have been made to help facilitate the rescue of victim (hereinafter: the bearer), using devices combining GPS and biometric surveillance such as "Personal status physiologic monitor system and architecture and related monitoring methods", WO 2004/084721 A2 and "Portable pulse monitoring device and method of its operation", EP 1 679 672. These approaches suggest devices that automatically trigger or permit a bearer to trigger an emergency call using cell phones. Such and similar device-based systems help to alert agencies depending on the use of the invention and can be used almost everywhere where GPS signals can be received. They lack however the ability to reach out to a larger group of people able and willing to help immediately because of their unawareness of the insufficiency during the most critical times; thus rescue attempts remain extremely difficult, the more so in buildings or areas with a large footprint where GPS is unavailable.

Further device-based systems are already available, which permit a bearer to press a distress button worn on a chain around the neck or on a belt clip using land-line telephones to call a pre-stored number of an operator. Those systems are limited to a specific locality.

The German "Malteser" emergency services recently started to offer a device-based system, in which after a distress button is pressed by the bearer the system then localises via GPS satellites the bearer's location and sends this information to the emergency service via cell phone networks. While this has the bearer in theory not restricted to one place like the systems mentioned above, it fails systematically if the victim is unable to trigger the distress call, as an automated, biometric trigger is not available, if the victim is within a building or otherwise GPS data cannot be accessed, as when the victim is not on street level and if the only number stored is the number of the emergency service that sells the device and no third party can be contacted.

None of the existing systems deals with the problem to provide rapid aid by first responders and situational information required for finding and reaching the bearer. A rescue team might be unable to enter a place or building due to burglary prevention such as fences and/or reinforced windows and doors. This means that in a most tragic case imaginable a rescue team may be able to see the bearer yet be unable to get to him due to reinforced windows and doors.

The objective of the present invention is to facilitate assistance in emergency situations in that situational information and/or situational measures dependent on the current position/location of the bearer are made available for the respective responders. More particularly, the goal of the present invention is

- to lessen the time between a harmful event happening to a person and arrival of an emergency service,
- to have first aid provided even before arrival of the emergency service, and
- to facilitate the access to the person,
- while determining the location of the person of the distress call, as in different places and during different times and in different cases of emergency, different persons and emergency services need to be informed, and this even if the victim is located in an area where GPS signals cannot be received.

The objective of the present invention is solved by a system and a method as defined in the claims accompanying.

According to an aspect of the present invention, a system is provided. The system comprises a processor-based portable device having a communication unit and a position determining unit and a life circle database. One or more life circle records are defined in the life circle database. Each life circle record is associated with a position/location and comprises contact information and/or instructions to be applied for contacting at least one responder and/or for performing one or more predefined operations in case of a distress situation of a bearer of the processor-based portable device. A life circle record to be used at a distress situation is selected on the basis of a current position of the processor-based portable device.

According to an embodiment of the present invention, the processor-based portable device is adapted to sense wireless emission signals. The system is adapted to select the life circle record for a current position of the processor-based portable device on the basis of wireless emission signals sensed by matching the sensed wireless emission signals with predetermined patterns of wireless emission signals associated with each life circle record.

According to an embodiment of the present invention, the life circle database is comprised in the processor-based portable device (100) or accessible through a networked service provider, wherein the service provider is part of the system.

According to an embodiment of the present invention, the system is adapted to match life circle records of different bearers on the basis of the positions/locations associated therewith and the system is adapted to extract information and/or instructions from at least partially matching life circle records to be provided supplementary to a life circle record.

According to an embodiment of the present invention, the system is adapted to update a pattern of wireless emission signals associated with a life circle record.

According to an embodiment of the present invention, the system is adapted to match the sensed wireless emission signals and the patterns associated with life circle records on the basis of a heuristic algorithm.

According to an embodiment of the present invention, the processor-based portable device comprises a physiological data sensing unit for sensing physiological data of the bearer of the processor-based portable device, an environmental data sensing unit for sensing environmental data of the environment, in which the bearer of the processor-based portable device is currently located, and/or a signalling unit for generating attention gaining signals. The sensed physiological data and/or the sensed environmental data are compared to one or more predefined values for enabling an automatic detection of a distress situation.

According to an embodiment of the present invention, the processor-based portable device is adapted to contact a phone server, which is capable of establishing communication with several responders at the same time.

According to an embodiment of the present invention, the system is adapted to send a broadcast message including position/location information to other processor-based portable devices and/or mobile communication enabled devices for requesting aid by one or more person in the vicinity of the processor-based portable device.

According to an embodiment of the present invention, the system is adapted to send at least one broadcast message including at least position/location information to other processor-based portable devices and/or mobile communication enabled devices for requesting aid by one or more person in the vicinity of the processor-based portable device. With this embodiment it is possible to send a single or multiple messages depending on the kind of distress event/signal. It may be possible to notify or call a number of different first responders 1, 2, 3 in the vicinity of the injured person and an operator by a conference call in case an accident distress occurred. Similarly it is possible to notify e.g. a first responder 1 and 4 via SMS in case of an "I am hungry" distress signal or event. It may also be possible to call a defined first responder 1 by phone in case the distress signal is indicating "nausea".

According to an embodiment of the present invention, the number of broadcast messages including the kind of information depend on the position/location information and/or on a type of distress situation and/or other information received e.g. from a sensor in the system or the processor based portable device. In case of a car implementation of the device such sensors may comprise sensors such as heat sensors, acceleration sensors, tank sensors. In case of a distress signal "accident" the system may also adapt the selection of the first responders according to this additional information. It may be possible to call local first responses according to the combination of the position found and the alarm trigger such as an empty tank, a flat tyre or engine failure signal, or to call an ambulance depending on the case which vital functions indicate the necessity of medical assistance, e.g. differentiating between strong signals sent out from the acceleration sensor indicating an accident versus a reading of cardiac arrest.

In another example embodiment the system is adapted to send a broadcast message including position/location information and identification information to other processor-based portable devices and/or mobile communication enabled devices for requesting aid by one or more persons in the vicinity of the processor-based portable device, and/or wherein the processor-based portable device installed in an automobile is adapted to send a broadcast message including position/location information and identification information to other processor-based portable devices and/or mobile communication enabled devices for requesting aid by one or more person in the vicinity of the processor-based portable device. The aspect of including identification information into the broadcast information may ease the job of a first or second responder. If e.g. the distress (life cycle) signal includes a "got lost" information it may be advantageous to simultaneously send a personal description along, to enable security services to identify the person even in crowded areas. This aspect is also useful to identify e.g. a vehicle the person uses if the first responder knows that he has to look for a certain car of a certain type, manufacturer, and colour. In every case involving a distress signal sent from a car or from within a car, it is advantageous to simultaneously send not only the personal description, but also information about the car, in order to enable security services or first responders unfamiliar with the look of the vehicle to find the person even in high traffic areas; e.g. a car could be parked on the roadside within city limits after the driver suffered from a stroke; finding the driver would otherwise require first responders or ambulance personnel to look inside every car within proximity of the signal sent out; with the additional information such e.g. as colour the search can be immediately narrowed down to a smaller sample of cars. It may also be possible to transfer an Image of the car or a portrait of the person sending the distress signal to the one or more responders. This feature strongly simplifies the identification of the person in distress. It may also be possible to send additional information such as elevation to the first responders to identify more readily a level in a building where the person in distress is located at. It is envisaged to design the system in a way that the identification information is displayed to the operator and/or the first/second responder, to simplify the response.

According to an embodiment of the present invention, the processor-based portable device is provided with at least one sensor to automatically determine a distress situation on the basis of signals from said sensors and to automatically send a distress signal or to automatically set up a connection to an operator or to one or more predefined responders. In the future people will get more and more surveyed by different sensors such as cardiogram, blood pressure-, blood oxygen- or blood sugar sensors. Different sensors may directly enable the processor-based portable device or the system to identify different distress events such as low blood sugar or alarming heart rates to directly notify a predefined kind of first responder depending on the respective sensor data. It could be desirable to notify a respiratory physician in case only the blood oxygen sensor value drops below a certain threshold. Similarly it may be desirable to notify a cardiologic first responder in case the cardiac sensor shows alarming values. In case of slowly dropping blood sugar values it may be sufficient to notify a food service first or to notify an ambulance in case the blood sugar value indicates heavy hypoglycaemia. It is possible to preselect the first responders directly at the processor-based portable device or at an operator/operator server of the system. That is the sensor values may serve as basis for the urgency of the distress signal to be sent and/or as a basis for the selection of a certain first/second responder. The correlation between sensor values and selection of distress signal/first responder may be directly made by the user or by the operator/operator server of the system.

According to an embodiment of the present invention, the processor-based portable device is provided with a remotely controllable signalling device that can be activated by the first responders. The signalling device or signalling component may be embodied as a light radio or sound beacon that may be activated by a first responder in vicinity. This embodiment is tailored to a situation in which a patient in distress may not be easily identified, such as in a concert, at public places or in case the patient is unconscious and in a single room of a larger house. This embodiment may also be used to aid finding a person e.g. in a bushy outdoor environment, where a location by GPS may not be sufficient to find and identify an unconscious person in distress.

According to an aspect of the present invention, a method for being performed at the aforementioned system is provided. A life circle database comprising life circle records and sub life circle records is provided, with sub-life circles being predefined life circles within one or more larger predefined life circles; by using sub-life circles it is possible to further pin down the user's location without necessarily changing the addresses of the distress call(s); e.g. a life circle might be a factory building, sub-life circles then the administrative offices on the 16th floor within the building and further sub-life circles the main office or the public men's toilet facilities. Additional text information might then not only include codes in order to get into the building, but also directions on how to reduce the search area where the user might be. Each life circle record is associated with a position/location and comprises contact information and/or instructions. A life circle record is selected out of the life circle records provided by the life circle database on the basis of a current position of a processor-based portable device (100). The contact information from the selected life circle record is applied for contacting at least a responder and/or one or more predefined operations from the selected life circle record are performed in case of a distress situation of a bearer of the processor-based portable device (100).

According to an embodiment of the present invention, life circle records of different bearers are matched on the basis of the positions/locations associated therewith. Information and/or instructions are extracted from at least partially matching life circle records to be provided supplementary to a life circle record.

According to an embodiment of the present invention, a pattern of wireless emission signals associated with a life circle record is updated.

According to an embodiment of the present invention, sensed wireless emission signals and the patterns associated with life circle records are matched on the basis of a heuristic algorithm According to an embodiment of the present invention, physiological data of the bearer of the processor-based portable device is sensed, environmental data of the environment, in which the bearer of the processor-based portable device is currently located, is sensed, and/or one or more attention gaining signals are generated. The sensed physiological data and/or the sensed environmental data are compared to one or more predefined values for enabling an automatic detection of a distress situation.

According to an embodiment of the present invention, a phone server for establishing communication with several responders at the same time is contacted.

According to an embodiment of the present invention, a broadcast message including position/location information is sent to other processor-based portable devices and/or mobile communication enabled devices for requesting aid by one or more persons in the vicinity of the processor-based portable device.

According to an example embodiment of the present invention the method further comprises sending at least one broadcast message including position/location information to at least one other processor-based portable device and/or at least one mobile communication enabled device for requesting aid by one or more persons in the vicinity of the processor-based portable device. The system may be configured to send different messages to an operator and or different or multiple responders, depending on the present life circle and location information. It may also be necessary to send more than just a single message to just a single operator and/or responder. It is also envisaged to set up a conference call between different responders in the vicinity of the person sending the distress signal and the operator to coordinate the first response. It is envisaged to set up a conference call including different responders in case of an emergency signal in a "home" life circle. Thereby the first response may be coordinated, in case of a fire, it is e.g. possible to call firefighters, an ambulance and inform the ambulance on different medications that may be needed for the first response but may not be accessible due to the fierce condition. Similarly in case of a "hunger" distress signal it may be possible to notify a first responder to provide food and another first responder by SMS to provide support for spoon feeding, in case the person has e.g. broken hands. Similarly, in case of a minor distress event it may be sufficient to notify a single low-level first responder by phone to provide relief without the necessity to call an ambulance.

According to an embodiment of the present invention the number of broadcast messages and the kind of information included depend on the position/location information and/or on a type of distress situation. A distress in a home life circle is usually not as threatening as the same distress in an unfamiliar environment; therefore the same distress situation may require different responses and different responders.

According to an embodiment of the present invention the system is adapted to store identification information and to send at least one broadcast message including position/location information and identification information to other processor-based portable devices and/or mobile communication enabled devices for requesting aid by one or more persons in the vicinity of the processor-based portable device. This embodiment is designed for life circles that are outside the user's home, i. e. in the public, in the streets or in crowded environments.

According to an embodiment of the present invention the processor-based portable device is installed in an automobile and is adapted to send a broadcast message including position/location information and identification information to other processor-based portable devices and/or mobile communication enabled devices for requesting aid by one or more person in the vicinity of the processor-based portable device or vehicle. In this embodiment informations for identifying the automobile such as type of vehicle, manufacturer, colour, and license plate number are transmitted to one or one of the first responders. It may also be possible to send a photo or an image of the vehicle directly to the first responders. Such an image may help to identify a certain car e.g. on a parking lot. Similarly, it may be helpful to exclude e.g. a car wreckage as the source of the distress signal.

According to an embodiment of the present invention the processor-based portable device is provided with at least one sensor. In this embodiment the method further comprises automatically determining a distress situation on the basis of signals from said sensors and automatically sending a distress signal or automatically setting up a connection to an operator or to one or more predefined responders. The sending of a distress signal or the setting up of a connection to an operator or to one or more predefined responders can be performed according to sensor data received from the sensors. It may be possible to first indicate abnormal sensors values to the user, to enable him to take counter measures or to requesting him to send a distress signal. This embodiment may also comprise a step of evaluating sensor data and selecting a certain first responder on the basis of the sensor data. Depending on the types of sensors and the types of possible distress situations it is possible to send respective customized distress signals to an operator or directly to one or more first responders, that are specialized on responding to a special distress event as indicated by the sensor data/values. It is possible to pre-define a correlation of sensor data to distress signals and distress signal destinations. It is also envisaged to transfer the sensor data to an operator/operator server for evaluation of the sensor data and for generation of the distress signal and especially for the selection of the at least one first responder to be notified.

According to an embodiment of the present invention the processor-based portable device is provided with a remotely controllable signalling device, and the method further comprises receiving an activation signal from a responder and activating said signalling device. The signalling device may be used for the final approach to the person in distress if it is not possible to immediately find the person in distress. The processor-based portable device may be provided with signalling device such as a loudspeaker, a light source, a radio beacon and/or a smoke signal. The signalling device may be used in crowded areas, indoors and outdoors when the life circle does not provide sufficient information to immediately find the person in distress, due to e.g. unconsciousness.

The present invention will hereinafter be described and explained in detail with reference to the drawings enclosed, where FIG. 1 illustrated schematically bearer's device according to an embodiment of the present invention.

DEVICE

It is necessary to firstly provide a person (hereinafter also: bearer) who is to be protected by an integrated, compound system (hereinafter: the system) in case of an emergency with the possibility to start (hereinafter also: trigger) a distress call asking for help (hereinafter: distress call) either by a switch, a detected signal or combination of switches and/or detected signals on the device 100 carried by the bearer, or via touch-screen of the or connected to the device, or by pressing a combination of switches or by speaking in a voice recognition unit, be it in or on the device or externally. The bearer's device 100 may be a multi-component device comprising individual units, which are for instance worn on different places on the bearer's body and interconnected by wire or wirelessly using for instance WPAN (wireless personal area network) technology. The bearer's device implemented as a multi-component device comprises preferably a main unit, to which the further separate components are interconnected. Such a main unit collects all data and signals from the components and processes the data and signals.

Figure 1:
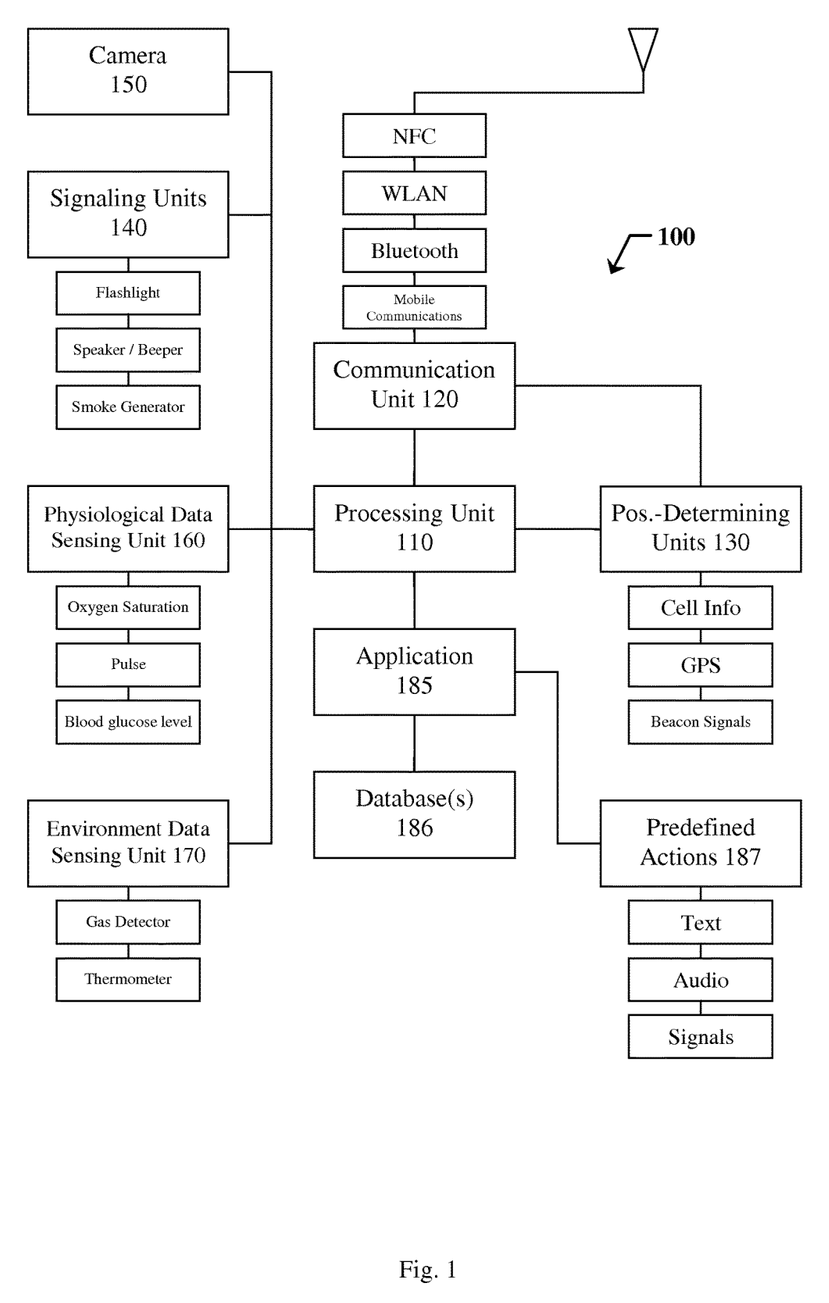

A bearer's device according to an embodiment of the present invention is schematically illustrated in FIG. 1. The schematically illustrated bearer's device is a processor-based device 100 carried by the bearer equipped with a general purpose processor or controller 110, a wireless communication unit 120 comprising preferably one or more bidirectional communication units such as one or more mobile communications units such as GSM, UMTS, WDCMA and/or LTE and one or more local wireless communication units such as a Bluetooth unit, a WiFi/WLAN (wireless local area network) unit, WPAN (wireless personal area network) unit, ZigBee, IrDA (Infrared Data Association) unit and/or a NFC (near field communication) unit and a position determining unit 130 comprising for instance a satellite-based positioning system such as a GPS/GLONASS (global positioning system or Globalnaja Nawigazionnaja Sputnikowaja Sistema) receiver and signal detecting units for detecting beacon signals. The position determining unit 130 may make use of any components of the wireless communication unit 120 for determining a current position of the bearer. The processor-based device 100 may further comprise a signaling unit 140 including for instance a flashlight, a speaker/beeper and a smoke generator and a physiological data sensing unit 160 for measuring and monitoring physiological measures like pulse, electrocardiogram data, blood oxygen saturation level, blood glucose level and the like. The physiological data sensing unit 160 may be a unit as described in EP 1 679 672. Moreover, the processor-based device 100 may comprise a camera 150, preferably activatable by remote control signal, for taking still pictures and/or picture sequences, and/or an environment data sensing unit 170 including for instance a gas detector such as a detector for sensing the concentration of CO, $CO_2$ and/or any other toxic gases, a thermometer and/or a smoke detector.

Further, the processor-based device 100 is equipped with a display for displaying information, inputting means allowing the bearer for manual input of information or manual operation of hard and/or soft switches triggering signals, outputting means for outputting acoustic and/or optical signals including in particular audio input/output means such as microphone and speaker and/or light indicators.

Beacon devices emitting beacon signals are preferably stationary devices placed permanently at a predefined location and emit a unique wireless signal like a MAC address, yet does not need connection to any network. The beacon device's unique signal and exact location of the device including for instance floor number and/or room number may be stored in a database for any bearer to use this information; likewise, also WiFi/WLAN networks or other wireless signal emitting systems. Signals emitted by the beacon devices may carry location information such that a database providing location information may not be necessarily required. Such a beacon device may be placed next to an entrance area and emit only a very faint signal so the bearer's device can assess that the bearer is for instance moving within a building coming into the reach of this beacon device and losing the signal again passed through the door, to which the beacon device has been fixed. With the help of such beacon device and its unique information it is easier to locate and follow any bearer of a device, in particular but not only if he or she has never been there before, and efforts a bearer must make to enter position information of his life circles can be lessened. It should be understood that such beacon devices may make use of known wireless communication standards such as for instance WLAN, Bluetooth, Zigbee, IrDA or NFC and also any proprietary technologies.

The different components and units of the aforementioned device 100 according to an embodiment of the present invention and the functions thereof will become more intelligible on the basis of the following description. In particular, the operation of the bearer's device 100 controlled by an application 185 together with one or more local databases 186 and/or remote databases and a set of predefined instructions and rules 187 will be more fully understood.

[Life Circles]

The bearer carries the device 100 with him or her to inform one or several persons (hereinafter: first responders) and/or the medical personnel, ambulance, police, fire police or other emergency services (hereinafter: emergency services) and/or an operator (hereinafter: operator) not only with an approximation of but rather a very precise location to facilitate rapid adequate assistance and/or reaction.

A rapid adequate assistance does not only require information about the location of the bearer as precise as possible but also context information about the location of the first responders and the emergency services. Such context information is provided to during preparation of the system.

To a large extent every person follows a repetitive routine revolving around regularly and/or frequently visited places and activities (hereinafter so-called life circles); as for places there will be a home, one or more working areas such as an office, conference area in buildings, a vacation home, sports gym, running track(s), coffee shop(s), bar(s) or restaurant(s) the bearer uses to frequent, and even restroom(s) close to or within his life circles.

Figure 3:
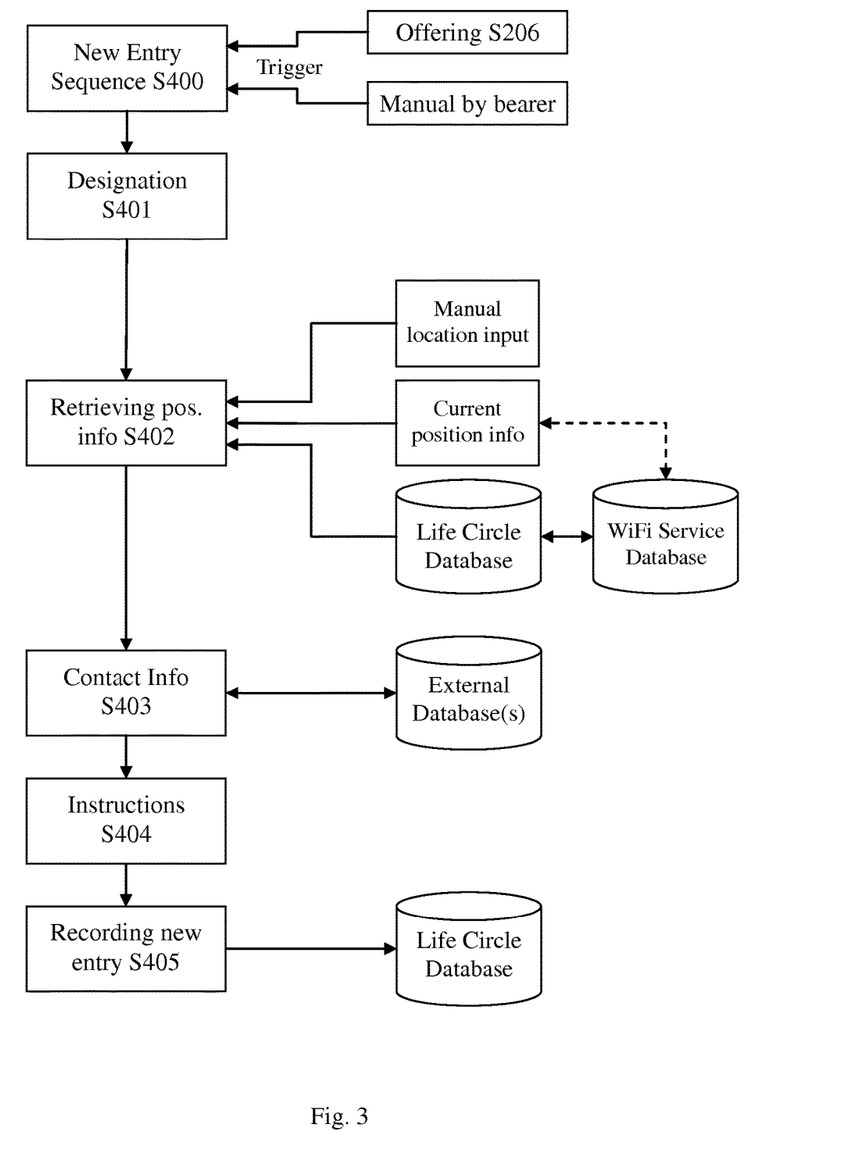
FIG. 3 depicts a schematic flow diagram for generating a definition of a life circle of the bearer according to an embodiment of the present invention

The bearer who wants to protect himself in case of a potential insufficiency predefines in one or more databases the bearer's areas of daily routines as life circles. Such life circles may be also predefined in the one or more databases by a third party wanting to protect the bearer in case of a potential insufficiency. FIG. 3 illustrates schematically an operation sequence for creating a new life circle record in the hereinafter so-called life circle database. The life circle record comprises, among other things, following exemplary information according to an embodiment of the present invention:

individual designation of the life circle (cf. step S400); and position information and/or location information and/or address information (cf. step S402) describing: e.g. coordinates, a street and a town or an area (e.g. "city park"), in large buildings with floors and room numbers (e.g. "my office room 1221 floor 12", "lady's toilet on floor 12", "conference room 2 on floor 9", "parking level-3"), a short form to be displayed on the device screen ("home", "my office", "jogging track London Hyde park east"). The position/location information may be determined automatically (GPS and/or WiFi blinking) and/or manually by bearer input and/or by selection of a life circle already defined and/or by selection of position/location information stored for later use during tracking operation (cf. step S220) as described in the following in detail.

To every life circle the bearer names at least one potential first responder to be contacted (cf. step S403) by the device, by providing, among others, one or more of the following exemplary information according to an embodiment of the present invention:

designation(s) or name(s) of potential first responder(s), contact information such as contact to be established via cell or land-line phone, text message, email or any other form of written or audio communication; the corresponding number or numbers—cell phone and land-line—or email address to be contacted; the text to be sent or audio file to be played, stored either on the device or remotely; for different types of emergencies and/or times the service may permit differentiation among desired first responders to be contacted, such as particular special units or medics in the case of health issues or the local police in the case of a crime against the bearer; a night guard in an office building before for instance 8 am and after 6 pm and on public holidays and weekends but the office manager, front desk or a nurse working for the company during all other times (especially working hours);

one or more audio signals or recordings to be played via loudspeaker K of the device or possibly a remote loudspeaker (cf. step S404);

one or more general persons such as the closest relative and general medical doctor, to be informed in any case notwithstanding the whereabouts and time of the bearer's insufficiency (cf. step S403);

if a camera is part of the device, to turn it on and transmit and/or store pictures (cf. step S404);

text or audio files with information about the bearer to be transmitted to for instance emergency services in order to better enable first aid treatment (cf. step S404);

text or audio files with information about the bearer to be transmitted to a hospital for general treatment, such as health problems, allergies, previous and current treatments in medical institutions etc. (cf. step S404); and/or if a (human) operator is used information for the operator as to priority of first responders and other information to facilitate efforts to contact first responders, such as "has the key to my apartment", "is trained in first aid and lives 3 minutes from my house", "has access to defibrillator at front desk of his office next to mine" and similar information, which facilities rapid adequate assistance and/or reaction in specifically selected response to different situational insufficiencies such as medical insufficiency, criminal act, general support and the like (cf. steps S403 and S404).

The information about a life circle may also describe an activity that may or may not be in a specific area such as "street jogging", "going for a walk with the dog", and "inserting my insulin". While here the location is not named or only in a more general form and thus it must be relied on automatically gathered positioning information such GPS data or manual entries by the bearer, it may help to describe other physiological levels—for example a likely increase in heart rates when jogging, and to define either additional or sole first responders in this specific activity, such as a doctor familiar with the bearer's treatment in case an emergency is placed due to an insulin overdose. The bearer may thus define, if this life circle overlaps with another life circle, such as "inserting my insulin" in the local life circle "my office", or if it is the sole life circle to be followed.

All this entered information is then stored (cf. step S405) along with the bearer's personal information in a database (hereinafter: personal life circle database or life circle database). The personal life circle database is preferably hosted by the internet-based service provider and/or the bearer's device 100.

The information provided by the bearer for the life circle entries/records in the life circle database may be supplemented by information retrieved from one or more networked (Internet-based) databases including for instance contact information of a medical/ambulance service, hospital, fire fighters, police station, etc. close to or in the life circle defined by the bearer.

[Positioning and Life Circles]

Figure 2:
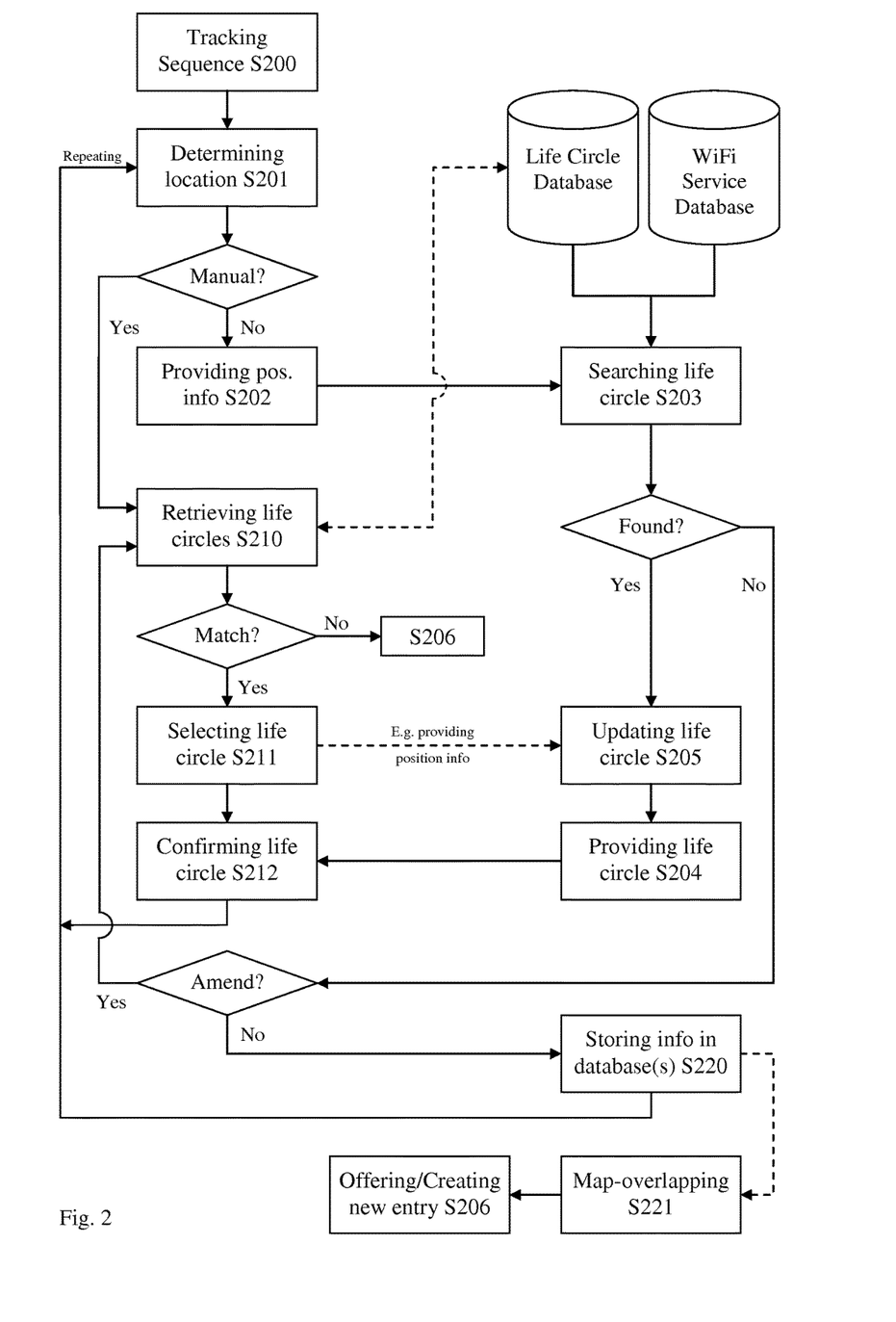
FIG. 2 depicts a schematic flow diagram for determining a life circle of the bearer according to an embodiment of the present invention.

As aforementioned, the determination of the position of the bearer and the mapping of the bearer's position to a predefined life circle is one aspect of the present invention. An exemplary sequence diagram according to an embodiment of the present invention is illustrated in FIG. 2. The positioning of the bearer should be as precise as possible. Preferably, any satellite-based positioning system (hereinafter designated as GPS without the intention to limit the generality) such as the Global Positioning System is used by the bearer's device to constantly track the bearer (cf. tracking sequence S200). The bearer's position is tracked in order to identify a life circle matching with the current position of the bearer's device. Once the GPS unit and the bearer's device 100 detects (cf. steps 201, 202 and 212), respectively, that the bearer has arrived at a certain life circle, the bearer may be asked for confirmation; likewise the bearer may manually select and/or confirm his arrival at the predefined place/life circle (cf. steps S201 and S210 to S212), in particular when the bearer is in a building, in which the bearer frequents different places, such as his office, conference room, storage room, garage, toilet, coffee shop, etc. As long as no new information is found via GPS, another positioning system such as wireless signals emission detection (cf. following description) or made by the bearer via an entry, the system presupposes the person rests in the last place verified.

An alternative of positioning to GPS is advantageous for areas without or with unreliable GPS reception, especially within buildings. Such an alternative of positioning to GPS may be also applicable in addition to and/or in support of satellite-based (GPS) positioning. For instance, in areas with a low density of housing and low buildings it is easy to locate the bearer even then, as is the case when buildings are of very small size. The bigger and taller buildings are the more difficult a satellite-based (GPS) positioning for the bearer becomes. The following means are, however, not restricted to these situations; at times it can be useful in cases of a working GPS reception as well.

Positioning the bearer is made possible via surrounding wireless emission signals (cf. step S202) such as cell information available through mobile communications systems, WiFi/WLAN, Bluetooth, NFC or other signal beacons' emission signals. Different techniques may be applied, among other depending on the wireless signals to be evaluated, such as nearest access point location, time difference on arrival (TdoA), received signal strength indicators, triangulation, time of flight, etc.

According to an aspect of the present invention, the bearer's device uses heuristically all wireless emissions detectible by the bearer's device for tracking as the wireless emissions are preferably stored and can be retrieved from a database associating the detected wireless emissions by the bearer's device with a position/location and/or one of the life circles predefined by the bearer rather than the designator of for instance only one WLAN or WiFi transmitter. Thus any device emitting a wireless signal, which is detectible by the bearer's device, can be used as an indicator of a position/location and a life circle, respectively.

For instance, the first time a bearer arrives at or enters a life circle area and acknowledges the arrival, the device detects current GPS location coordinates or in the case of missing GPS signals last GPS location coordinates and starts a wireless signal emissions recognition sequence to detect the wireless signal emissions by preferably unique signals/identifiers such as names, designators, MAC (Media Access Control) addresses and/or signal properties such as signal strengths (the detection operation will be designated as "WiFi blink" hereinafter without limiting the generality). The results are stored in a service database (hereinafter: WiFi service database), which is connected to, associated with or part of the personal life circle database(s) (cf. steps S202 to S205).

As soon as GPS contact is lost, the device may automatically trigger the aforementioned WiFi blink operation. However, the aforementioned WiFi blink operation may be also performed (regularly, upon manual user actuation or condition driven) so as long as GPS positioning is still established, in particular when the bearer is getting close to an area, in which GPS reception is usually weak or lost and on the way between two life circles. As soon as unique identification and property information of at least one wireless emission signal in the WiFi service database is detected, the system will make a heuristic assessment as to determine the likelihood that the bearer's device is within or close to the pre-defined life circle. The system may ask the bearer to answer if such an assessment is correct. As soon as the bearer accepts or rejects this, personal life circle database and the WiFi service database, respectively, store place and the detected information from the WiFi blink operation for update (cf. step S205) and/or future use (cf. step S220). The heuristic algorithm used may consider that the wireless signal emissions may differ in time at one place for instance due to selectively activated wireless signal emitters such as WLAN access points.

In case there is not found a life circle, because the current position information does not match with any predefined life circle and the position/location information associated therewith, the bearer may be asked whether anyone of the predefined life circles should be amended with the current position information (cf. steps S210, S211, S205, S204 and S212). Therefore, the bearer may select one of the predefined life circles to be updated with the current position information detected/retrieved by the GPS unit, WiFi blink operation and/or bearer's manual location input.

Over time, i.e. the more data is stored in the WiFi service database, the heuristic algorithm can assess ever more precisely, which data is to be expected by WiFi blinking in a life circle or sub-life circle from all previous data stored in personal life circle database and the WiFi service database, respectively. Once the bearer reaches an area with an expected wireless signal emission pattern (cf. steps S202 to S204), the arrival in the predefined life circle and/or sub-life circle is signaled (cf. step S204); this may or may not continue to prompt a request to the bearer to acknowledge arrival (cf. step S212).

Through WiFi blinking and/or GPS tracking of the bearer's device and map-overlapping (cf. step 221), i.e. for instance comparing the stored location/position information and determining distances between the individual locations/positions, the system can find areas a bearer happens to frequent often and may offer the bearer to create a new entry in the personal life circle database (cf. step S206) for this particular area as new life circle for pre-definition.

In particular while GPS coordinates are not available but not limited thereto, the device may constantly or in intervals perform WiFi blink operation to determine the current position/location using the heuristic algorithm, if the bearer is moving or not in particular within a building.

In the case that a movement meter or an acceleration detector or for instance a battery charger using the bearer's movement is built into or attached to the bearer's device, a movement or operation of the movement driven battery charger may either trigger new or reduce the time interval between two WiFi blink operation, for it can be presupposed that the bearer moves.

[Handling of a Insufficiency/Emergency/Distress Situation]

Figure 4:
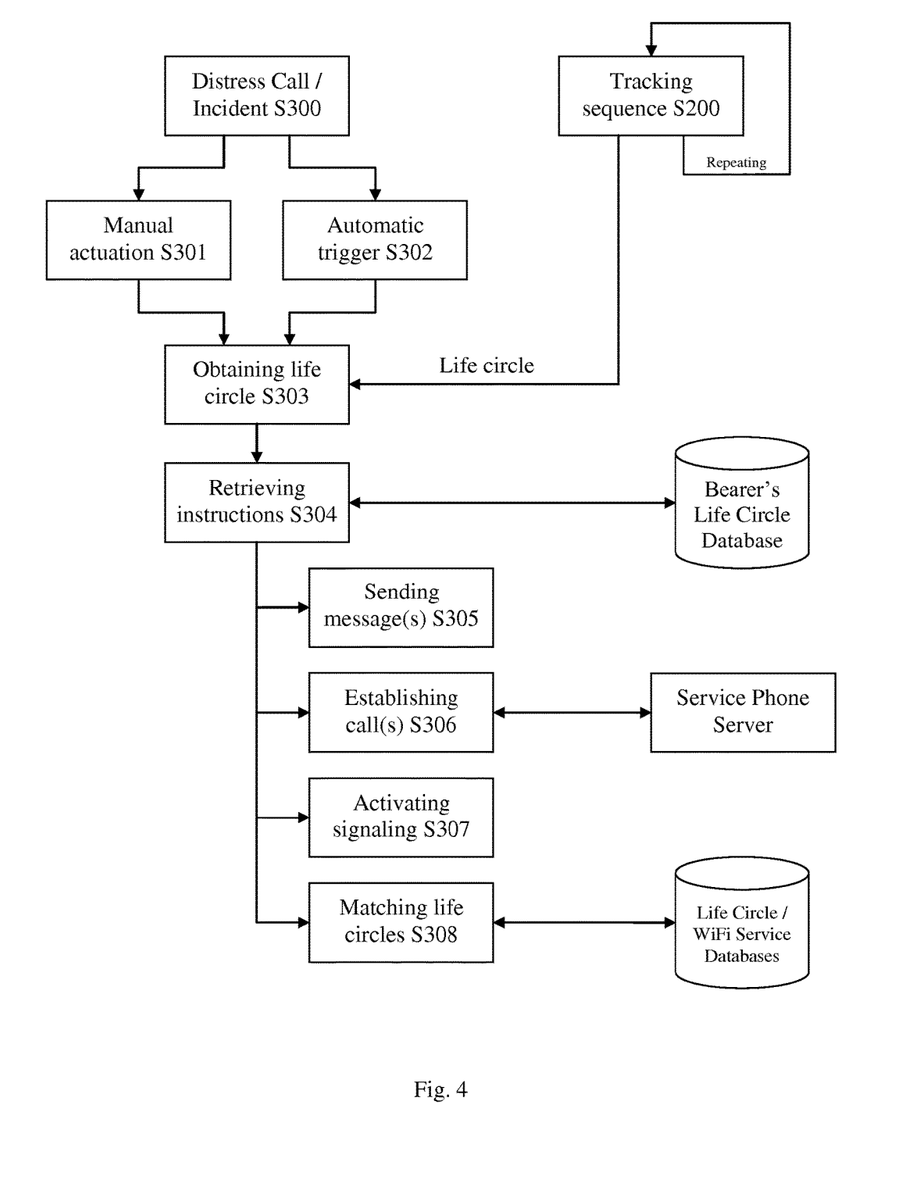
FIG. 4 depicts a schematic flow diagram for handling an insufficiency, emergency and/or distress situation according to an embodiment of the present invention

FIG. 4 shows an exemplary flow diagram for handling an insufficiency, emergency and/or distress situation according to an embodiment of the present invention. To detect an insufficiency situation such as a medical emergency the device may constantly monitor the bearer's physiological measures and/or environmental measures and compares the sensed measures with predefined levels such as, but not restricted to, heart rates, blood pressure, blood oxygen saturation and insulin levels or environmental measures exterior levels such as $CO_2$ concentration and the like. A distress call is triggered (cf. step S302) when such levels considered generally safe or predefined are exceeded on the upper or lower end. Such levels and thresholds may be stored in the device and/or in the system.

Alternatively, the bearer may trigger manually (cf. step 301) the distress call. If the bearer in the latter case asks for assistance other than emergency services or police, such as emotional or psychological help, the service operator may connect to such assistance as well, depending on the extent of services offered.

Once the so-called distress call is (automatically or manually) triggered upon an insufficiency, emergency or distress situation, the information as provided in the life circle associated with the current location/position of the bearer are handled and performed as predefined in the life circle record. The life circle, the information of which is to be processed in this insufficiency, emergency or distress situation, is obtained from or provided by the tracking sequence S200 (cf. step S303) already described above. The information stored in the life circle record (including for instance contact information, instructions, text and/or audio information, messages etc.) may be retrieved from the local and/or remote bearer's life circle database (cf. step S304). Depending on the level or quality of the system chosen by, the quality and quantity of predefinitions used by and/or the predefinitions made in the life circles used by the bearer, the contact to possible first responders, services and/or operators can happen sequentially or concurrently or both. In the following, possible instructed actions and/or measures in accordance with to the life circle information as schematically set forth in steps S305 to 308 of FIG. 4 will be described in more detail.

There seems at the time of filing a maximum of two cell phone lines be the current provision in Europe and America and a like provision for the use of cell phone and mobile data lines in smartphones. While this may or may not change over time, this number is used here and may be increased once such restrictions are no longer in place.

[Sequentially]

The bearer or the system may predefine that the contacts need to be done in sequence. Then text message, emails and/or phone calls are placed in the order predefined by the bearer in the life circle database. Depending on the technical conditions, the contacting, messaging and calling may be performed by the bearer's device without using any further services.

[Synchronously]

In the case the system allows and the bearer chooses synchronous contacts, these contacts may be established through a server computer run by the service provider (hereinafter: service phone server). This service phone server may be able to send out emails and text messages, at the same time contact all phone numbers chosen by the bearer and use one phone line to the bearer's device to get in contact and keep contact with the bearer.

These calls from the service phone server to the predefined phone numbers may be operated like conference calls such that one or more first responders and staff of emergency services can communicate with each other through the service phone server and preferably further via the service phone server to the bearer.

In case that the phone connection(s) is or are lost by the bearer, any or all of the first responders, staff of emergency services or an operator, the service phone server re-establishes immediately phone connections using either the bearer's device and/or the service phone server. If the connection from a service phone server to the bearer's device is lost or the system does not have contact to the bearer's device, such as if the distress signal did arrive by means other than the bearer's device, the bearer's device answers the call it then receives from the service phone server without any further handling of the bearer by using either a set of phone numbers predefined by the system that permit the immediate pick up of the bearer's device or by sending a password that makes the bearer's device pick up the call without bearer's interaction or by generally picking up any immediate call after the distress call (hereinafter: "immediate pickup functionality"), or use an incoming emergency call from the device and hold this connection. The bearer's device may be restricted to calls and communication connections, which are predefined on the basis of unique identifiers such as telephone numbers, uniform resource locators (URLs) and/or uniform resource indicators (URIs) and/or signals/instructs/indicators transmitted during communication connection set-up to the bearer's device.

[Sequentially and Synchronously]

In special cases, the bearer will choose to first have one or more potential first responders contacted and then—if or if not a response has been received by the operator or the bearer—to continue with even more contacts. This might be the case if the bearer's first choice is a first responder most likely and able to help, and only if this first responder declines or cannot be contacted, the next potential first responder in the sequence is called.

[Operator(s)] Sequentially and/or Synchronously

An (human) operator as described in EP 1 679 672 may be involved in a distress situation. In this case in a conference call measures and/or rescue efforts can be directed, non-essential first responders excluded due to their current distance, unavailability or because they start panicking. After contact is established with the bearer the operator(s) may decide to call only several people on the list, such as in the case of an armed robbery, where a nurse living in the same house pre-defined as first responder in sequence may not be the right choice to call, but rather the local police.

The operator(s) may also decide or be given instructions to work sequentially in some cases, concurrently in others, depending on the case; the operator might be told or decide to call sequentially in case of a nausea of the bearer, and concurrently in case of an acute heart attack.

There may be two separate conference calls in one incident: the main one as a conference-call-like direct connection among the bearer on one side and first responders confirmed by the operator and emergency service staff such as ambulance personnel on the other. The second one as an auxiliary conference call for potential yet not confirmed first responders; as soon as another first responder able and willing to assist is found, the operator transfers him or her from auxiliary to main conference call where the emergency service staff may direct all first measures/aid before its arrival.

In every case in which an service phone server is used, the phone number of the bearer's device must be available in order to facilitate connection with calls from the service phone server; thus any other calls currently connected at the moment of the distress signal to the device are preferably disconnected and any other incoming call after the distress signal are preferably barred even if the line is not busy except pre-defined calls, in order to keep the device available without the bearer's need to answer the call. For instance, any phone message, email or text message sent to potential first responders for this purpose will preferably not bear or attach the device's phone number but a number of the service phone server, only by dialing which the first responder(s) contacted can join the emergency conference call.

The service phone server may recognize answering machines, no answers within pre-set amounts of time and busy signals, in order to continue either sequential calls or not to disrupt both moderated and not moderated conference calls by means of busy signals, constant repetition of recorded responses etc.

[False Alarm Removal]

The device may have an alarm removal button or alarm removal by other input means of the bearer's device. Once activated this stops the call sequence and text message and/or sends send a second text message and/or calls numbers already called to play to them an audio file stating that no action is required due to false alarm.

[Locating the Bearer by Acoustical and/or Optical Signals]

Locating the bearer can be difficult in particular in areas that are very large, hardly accessible like large storage halls, show difficult lighting situations or even are not accessible at all to the public, as rooms specifically hidden as vaults and elevator shafts.

An audio alarm signal and/or audio file may be sent out via the loudspeaker of the bearer's device or a loudspeaker and amplifier connected by wire or wirelessly to the bearer's device, so people in the vicinity of the bearer may realise the bearer's distress situation. For instance a wirelessly connectable signalling device such as a WiFi/WLAN or Bluetooth-based device may be equipped with a loudspeaker and/or optical signalling means. As soon as the wirelessly connectable signalling device detects a distress signal, it can trigger an alarm sound or an audio file and/or alarm light signal to indicate a distress incident to people in the area. Since such a supplementary stationary wirelessly connectable signalling device does in contrast to the bearer's device not need to be run by batteries and there is no space constraint for the signalling means, it may emit much louder acoustical and/or brighter optical signals than the bearer's device.

A supplementary smoke generation device (hereinafter: smoke generator or capsule) may be triggered by the operator, the bearer and/or pre-defined condition(s), which may emit a coloured vapour or a foul or fire-like smell. The staff of the emergency service may ask the operator or the bearer to trigger the supplementary smoke device for them to see vapour rising up. The supplementary smoke device may be triggered to help that the public still unaware of any distress incident may become aware, may facilitate the work of the staff of the emergency service by informing an office front desk or facility manager about smoke or a foul smell or even report fire by calling the fire department. While the latter case may carry a fine for causing a false fire alarm it may still help to save the bearer's life.

Another supplementary flash device (hereinafter: flash strobe or flashlight) may be triggered emitting a flashing light, colour changing light, an extremely bright light or a light that resembles fire. The staff of the emergency service may see the light signal from distance. Attention of the public unaware of any distress incident in its vicinity may be drawn.

[Matching of Life Circles]

In case the current bearer's location is for instance not defined in one of the life circles, the positioning information gathered from the GPS receiver and/or the detected wireless emission signals may be used to identify a life circle defined by another bearer. Thus, if the location of a first bearer defined GPS position and/or detected wireless emission signals at least partially matches with position/location information associated with a life circle of a second bearer, it can be assessed with great certainty to be the location of the first bearer. Moreover, if the second bearer is currently located in the at least partially matching life circle, it can be further assessed that the second bearer is in close proximity to the first bearer. Such assessment can be used for reaction/rescue purposes while still respecting all privacy and data protection issues. To ensure this, a bearer may define some information in his life circle as either confidential or usable for other bearers as well.

It is possible to have the second bearer informed about the distress call of the first bearer in his vicinity, if the operator or the system detects that first bearer is in the life circle of the second bearer where or close to where first bearer has triggered the distress call. Thus another bearer may become first responder to the—possibly to him unknown—bearer of the distress call and may be informed accordingly by the operator or system.

With an operator or the system supervising the reaction/rescue upon a distress call, not only location assessment may be used but also information stored in the life circle database of another bearer may be retrieved such as that a special night guard or office manager at certain times has been pre-stored to be called and this may be a suitable first responder for any other bearer as well.

[Measures to Facilitate Contacting of First Responder(s)]

Cell phone numbers will most of the time be stored by the bearer. A potential first responder may be informed about the bearer's decision to choose him or her as first responder and enabled to download on his or her cell phone or computer a program (hereinafter: app) to facilitate contact in case of an distress situation of the bearer. Such an app may enable to transfer from the first responder(s) either generally or in the case of an distress situation following data: depending on the settings chosen on the cell phone by the first responder with the app either last known or GPS location at the time of the distress situation, and/or surrounding wireless emission signals and/or cell positioning data, i.e. the cell area in which the first responder's cell phone is connected to the mobile communications network; if the first responder's cell phone is switched off. Such information will be known and useful to the system and/or operator immediately, as other potential first responders can be contacted more efficiently. If GPS location and/or wireless emission signals and/or cell positioning using the bearer's life circle indicate that the first responder(s) is in close proximity to the bearer, focus can be given to contacting them instead of other first responders who are further away and/or at the moment of the distress situation without phone reception. Since an estimate of the distance is sufficient, the first responder does not need to be located as precisely as the bearer, so cell phone positioning data may here be used to estimate the location of the first responder.

The app may already be programmed into the bearer's device, so the bearer may become a potential first responder himself. As his location is checked constantly, life circles of the responding bearer on one side and the bearer in need of help may overlap and can be checked against each other. The system may also allow two bearers to look for overlaps after setting up their respective life circles and naming at least one of the bearers a possible first responder.

Other bearers unknown to the bearer in need of help may be contacted, if they permit to do so and are located close to the bearer in need (matching of positions and/or life circles).

[Setting Life Circles without Automatically Gathered Positioning Information]

A bearer may define his life circles with time approximations (e.g. daily, weekly or monthly), in particular in case the bearer's device cannot offer GPS neither wireless signal nor cell phone cell positioning. Such methodology is much less precise, yet still usable, as long as the bearer's routines remain very much the same over time. In this case the system may only estimate the whereabouts of the bearer and accordingly in an emergency use this information; it can still be improved, when the bearer is asked at the respective time if he or she arrived at the life circle.

If the bearer can only define life circles yet not a routine, the system can still work by manually acknowledging arrival at and departure from a life circle as described above. In this case the use of cell phone positioning may be advisable in addition.

In a like manner, the way between 2 life circles may be defined as a life circle.

[Bearer's Device without Means for Voice Communication]

In case the bearer's device does not provide a loudspeaker and/or microphone, the system can still be used. Still, the bearer might be able to define his or her emergency using communication means possible with the device. The distress call may be by text message or email, yet also a phone call using pre-stored audio information is usable, albeit without the possibility of two-way or at least one-way communication between the first responder(s) and the bearer.

[App to App Communication]

Using the app described above, two bearers using such an app at their respective devices may communicate in the case of an emergency of either other. Such a communication may be because a bearer responds to a distress call of another bearer who is either listed as first responder in the bearer's list and/or in close proximity.

Such a communication may be directly between two or more bearers when two or more life circles of bearers show an overlap of the life circles of the positions the two bearers are in and the bearers are listed in these two life circles as first responders or two overlapping life circles are or one life circle is openly available for use by third parties and both bearers are in one life circle that is openly available or one or both are named first responders in one life circle by one bearer and/or the life circle is openly available.

[Broadcasts]

Furthermore, a broadcast message may be send from the device of the bearer in need of help. Such broadcast message may be received by devices of other bearers or by other communication enabled devices (especially mobile communication enabled devices) running a program (app) for receiving such broadcast messages. The broadcast message may be sent without identifying any receiver. The broadcast message may only be sent within a defined area encapsulating the life circle of the bearer requesting for help. The broadcast message may be directly sent by the device or through a server of the service provider.

According to another aspect of the invention there is provided a system comprising a processor-based portable device having at least a communication unit, a position determining unit and a life circle database in which two or more different life circle records are defined, wherein each life circle record is associated with a different position or location and comprises contact information and/or instructions to be applied for contacting at least one responder and/or for performing one or more predefined operations in case of a distress situation of a bearer of the processor-based portable device, wherein a life circle record to be used at said distress situation is selected on the basis of a current position of the processor-based portable device. There are provided at least two different location spaced from one another which are defining different life circles. In case of a distress signal in one life circle other people are alerted than in case of a distress signal in another or different life circle. The distress signal may be triggered automatically or by user input, either manually or acoustically.

What is claimed is:

1. A system, comprising: a processor-based portable device having at least a communication unit and a position determining unit and a life circle database, in which one or more life circle records are defined, wherein each life circle record is associated with a position/location and comprises contact information and/or instructions to be applied for contacting at least one responder and/or for performing one or more predefined operations in case of a distress situation of a bearer of the processor-based portable device, wherein a life circle record to be used at a distress situation is selected on the basis of a current position of the processor-based portable device, wherein the system is configured to match life circle records of different bearers with the bearer of the processor-based portable device on the basis of the positions/locations associated therewith, and wherein the system is further configured to extract information and/or instructions from at least partially matching life circle records to be provided supplementary to a life circle record of the bearer of the processor-based portable device.

2. The system according to claim 1, wherein the processor-based portable device is adapted to sense wireless emission signals, wherein the system is configured to select the life circle record for a current position of the processor-based portable device on the basis of wireless emission signals sensed by matching the sensed wireless emission signals with predetermined patterns of wireless emission signals associated with each life circle record.

3. The system according to claim 1, wherein the life circle database is comprised in the processor-based portable device or accessible through a networked service provider, wherein the service provider is part of the system.

4. The system according to claim 1, wherein the system is configured to update a pattern of wireless emission signals associated with a life circle record.

5. The system according to claim 1, wherein the system is configured to match the sensed wireless emission signals and the patterns associated with life circle records on the basis of a heuristic algorithm.

6. The system according to claim 1, wherein the processor based portable device comprises a physiological data sensor for sensing physiological data of the bearer of the processor-based portable device, an environmental data sensing unit for sensing environmental data of the environment, in which the bearer of the processor-based portable device is currently located, and/or a signalling unit for generating attention gaining signals, wherein the sensed physiological data and/or the sensed environmental data is compared to one or more predefined values for enabling an automatic detection of a distress situation.

7. The system according to claim 1, wherein the processor-based portable device is configured to contact a phone server, which is capable to establish communication with several responders at the same time.

8. The system according to claim 1, wherein the system is configured to send at least one broadcast message including at least position/location information to other processor-based portable devices and/or mobile communication enabled devices for requesting aid by one or more person in the vicinity of the processor-based portable device, and/or wherein the number of broadcast messages including the kind of information depend on the position/location information and/or on a type of distress situation.

9. The system according to claim 1, wherein the system is configured to send a broadcast message including position/location information and identification information to other processor-based portable devices and/or mobile communication enabled devices for requesting aid by one or more person in the vicinity of the processor-based portable device, and/or wherein the processor-based portable device installed in an automobile is configured to send a broadcast message including position/location information and identification information to other processor-based portable devices and/or mobile communication enabled devices for requesting aid by one or more person in the vicinity of the processor-based portable device.

10. The system according to claim 1, wherein the processor-based portable device is provided with at least one sensor and wherein the processor-based portable device is configured to automatically determine a distress situation on the basis of one or more signals from said at least one sensor and to automatically send a distress signal or to automatically set up a connection to an operator or to one or more predefined responders.

11. The system according to claim 1, wherein the processor-based portable device is provided with a remotely controllable signalling device that can remotely be activated by said responder.

12. A method comprising:
providing a life circle database comprising life circle records, wherein each life circle record is associated with a position/location and comprises contact information and/or instructions;
selecting a life circle record out of the life circle records provided by the life circle database on the basis of a current position of a processor-based portable device;
applying the contact information from the selected life circle record for contacting at least one responder and/or performing one or more predefined operations from the selected life circle record in case of a distress situation of a bearer of the processor-based portable device;
matching life circle records of different bearers to the bearer of the processor-based portable device on the basis of the positions/locations associated therewith; and
extracting information and/or instructions from at least partially matching life circle records to be provided supplementary to a life circle record of the bearer of the processor-based portable device.

13. The method according to claim 12, further comprising sensing wireless emission signals; and
selecting the life circle record for a current position of the processor-based portable device on the basis of wireless emission signals sensed by matching the sensed wireless emission signals with predetermined patterns of wireless emission signals associated with each life circle record.

14. The method according to claim 12, further comprising updating a pattern of wireless emission signals associated with a life circle record.

15. The method according to claim 12, further comprising matching sensed wireless emission signals and the patterns associated with life circle records on the basis of a heuristic algorithm.

16. The method according to claim 12, further comprising sensing physiological data of the bearer of the processor-based portable device;
sensing environmental data of the environment, in which the bearer of the processor-based portable device is currently located; and/or
generating one or more attention gaining signals,
wherein the sensed physiological data and/or the sensed environmental data is compared to one or more predefined values for enabling an automatic detection of a distress situation.

17. The method according to claim 12, comprising
contacting a phone server for establishing communication with several responders at the same time.

18. The method according to claim 12, comprising
sending at least one broadcast message including position/location information to at least one other processor-based portable devices and/or mobile communication enabled devices for requesting aid by one or more persons in the vicinity of the processor-based portable device and/or wherein the number of broadcast messages and the kind of information included depend on the position/location information and/or on a type of distress situation.

19. The method according to claim 12, wherein the system is configured to store identification information and to send at least one broadcast message including position/location information and identification information to other processor-based portable devices and/or mobile communication enabled devices for requesting aid by one or more person in the vicinity of the processor-based portable device, and/or wherein the processor-based portable device installed in an automobile is configured to send a broadcast message including position/location information and identification information to other processor-based portable devices and/or mobile communication enabled devices for requesting aid by one or more person in the vicinity of the processor-based portable device.

20. The method according to claim 12, wherein the processor-based portable device is provided with at least one sensor, and wherein the method further comprises automatically determining a distress situation on the basis of one or more signals from said at least one sensor and automatically sending a distress signal or automatically setting up a connection to an operator or to one or more predefined responders.

21. The method according to claim 12, wherein the processor-based portable device is provided with a remotely controllable signalling device that can be activated by the responder, and wherein the method further comprises receiving a signal from a responder and activating said signalling device.

* * * * *